April 20, 1937.  J. W. SANDLIN  2,077,716

PUMP VALVE

Filed June 8, 1935

James W. Sandlin  Inventor

By  Jesse R. Stone
&  Lester B. Clark

Attorneys

Patented Apr. 20, 1937

2,077,716

UNITED STATES PATENT OFFICE 2,077,716

PUMP VALVE

James W. Sandlin, Humble, Tex.

Application June 8, 1935, Serial No. 25,555

7 Claims. (Cl. 251—129)

My invention relates to valves and, although the device has wide application, it is devised particularly for use in pumps.

It is an object of the invention to provide a valve which is reversible and adapted to be used in reverse position after one end becomes worn in use.

It is another object of my invention to provide a valve of this character which is arranged to rotate as it moves to closed position so as to automatically eliminate sand which may be upon the same, and preserve a seal when thus closed.

It is another object of the invention to provide a means for rotating the valve responsive to the flow of fluid past the same in either direction. I desire to provide rotating means which operates equally well when either end of the valve is presented toward the seat.

Another object of the invention is to provide a sturdy valve structure which is simple in construction and adapted to withstand heavy usage.

Figure 1:
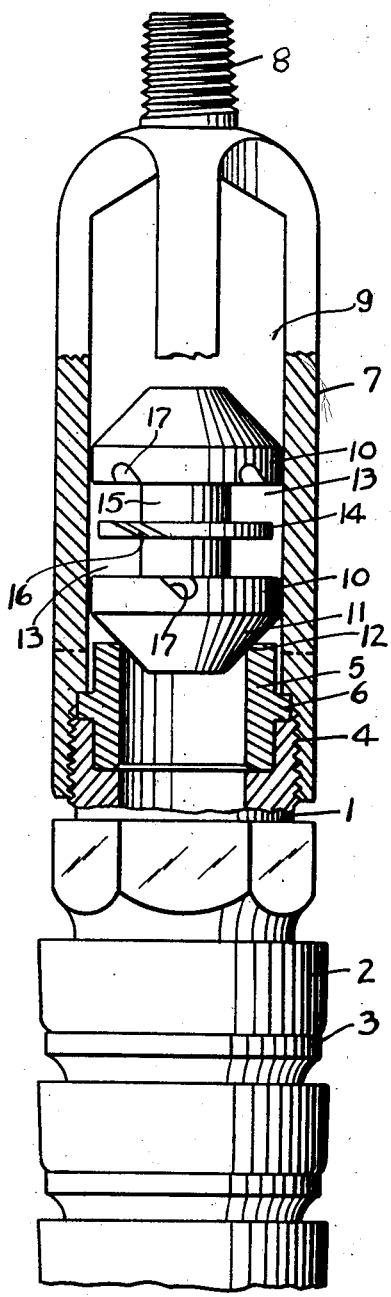

Referring to the drawing herewith, Fig. 1 is a side view of my valve shown in position upon a valve seat such as is employed in the ordinary traveling valve in deep well pumps, parts of the valve housing and seat being broken away for purposes of clearness.

Figure 2:
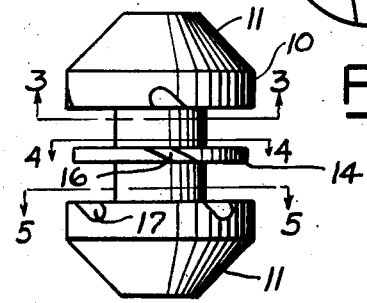

Fig. 2 is a side elevation of the valve removed from the pump, said view being taken at approximately right angles to the view shown in Fig. 1.

Figure 3:
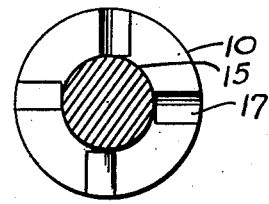
Figure 4:
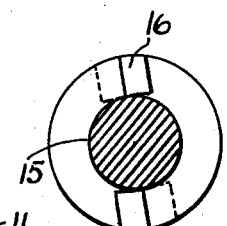
Figure 5:
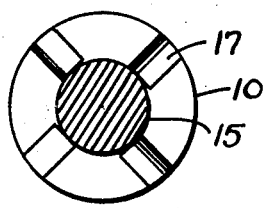

Figs. 3, 4, and 5 are transverse sections on the planes 3—3, 4—4, and 5—5, respectively, of Fig. 2, the views being taken in the direction of the arrows.

My improved valve may be employed in connection with the traveling valve or pump plunger such as is employed in pumping fluid from wells, and in Fig. 1 I have shown my valve as illustrated in connection with such a structure, it being understood, however, that this is only one use to which my valve may be put. Fig. 1 illustrates a pump plunger having a tubular body 1 with upwardly extending cups or packing members 2 thereon held in position upon the tubular body by spacers 3 in the usual manner.

At the upper end of the valve body is an inner annular recess 4 to receive the valve seat 5, said seat comprising a short collar or ring having a radial flange 6 thereon to be clamped between the valve body and the valve cage 7. Said valve seat is reversible in the usual manner of valve seats employed for this purpose.

The valve cage 7 is threaded at its lower end to engage the upper end of the plunger body and has its upper end formed with a threaded shank 8 for connection with the lower end of the sucker rod. This cage has a plurality of spaced legs between which is an open chamber 9 in which the valve may move, said legs forming a guide to direct the valve back to the seat after it has been raised.

The valve member is formed of a cylindrical body 10 which is tapered, as shown at 11, at both ends, said tapered ends being in the form of a truncated cone. The tapered portion of the valve is adapted to engage at 12 within the valve seat 5.

Between the two end portions 10, which are generally cylindrical, the valve body has been cut away to provide two annular recesses or chambers 13, said chambers being divided by a web or partition 14. This web is in the form of a radial flange formed on the reduced portion 15 of the valve body and of slightly smaller outer diameter than are the ends 10. This web is formed with a plurality of diagonal slots 16. Said slots are cut in the web or flange from the outer margin directly through to the inner margin of the flange and are inclined vertically at an angle of approximately forty five degrees. The side walls of these slots act as deflecting surfaces or vanes to assist in the rotation of the valve due to the flow of fluid therethrough. As will be seen in Fig. 4, I have shown two such inclined slots 16, it being understood, however, that a larger or smaller number of such recesses may be employed.

To assist in the rotation of the valve due to the flow of fluid thereby, I form in the upper and lower ends 10 of the valve inclined recesses 17. These recesses are formed on the inner faces of the said ends and extend from the outer periphery radially inward but are inclined relative to the longitudinal axis of the valve. The angle of inclination of these recesses 17 is preferably also 45° relative to the axis of the valve. As will be seen from both Figs. 1 and 2, these recesses are inclined upwardly and to the left on the upper head of the valve, and downwardly and to the right on the lower head of the valve. This is done so that the valve may be reversible. These inclined recesses 17 are equally spaced in vertically offset positions relative to each other in the upper and lower ends of the valve, as will be noted from Figs. 1 and 2, and preferably one of the recesses is in longitudinal alignment with one of the inclined slots 16 in the middle flange or web.

In the operation of the valve, the downward stroke of the plunger will cause an upward flow of fluid relative thereto through the interior of the plunger and will raise the valve off its seat, allowing the fluid to flow past the valve and up into the pump barrel. As the valve is raised from its seat and the fluid courses upwardly along the side thereof and into the annular channels 13, it will impinge against the side walls of the recesses 17 and the slots 16. The fluid will engage particularly in the slots 16 of the flange and the recesses 17 at the upper end of the plunger, said slots and recesses together forming a miniature turbine operating to rotate the valve. The recesses 17 in the lower end of the plunger will be of little value in causing the rotation of the valve.

It should be noted that the chambers 13 are constantly filled with liquid which influences their action in use. The ends of the valve, being of the full diameter of the interior of the cage 7 have, in combination with said recesses, a dash pot effect which tends to prevent the valve from pounding in the seat during the reciprocation of the plunger.

When the plunger is raised upwardly the valve will drop back to its seat and in so doing will continue to rotate so that as it strikes the seat it will tend to remove any sand or sediment thereon and will seat at each reciprocation of the plunger in a slightly different position upon the valve ring. It will thus be seen that the valve will be worn smooth at the point where it engages the seat and if irregularities occur either in the valve or the seat they will tend to be ground smooth and thus continue to make a tight seal until the valve has been materially worn.

When the lower end has become sufficiently worn to impair the sealing effect of the valve, the said valve may be reversed, presenting the upper end downwardly and will thus obtain a new seating surface presented to the valve seat. In this position of the valve the inclined recesses 17 in the worn end of the valve will be presented downwardly at the upper end and will act to assist in the rotation of the valve in the manner described.

The advantage of my improved construction lies in the fact that the valve will operate for long periods of time without impairing the seal between the valve and its seat. This is due to the rotation of the valve caused by the particularly effective structure of the valve itself. Thus when the valve has become worn it may be reversed and its life doubled before it needs to be discarded as worn out. The further advantages of this device will be obvious to those skilled in the art.

What is claimed as new is:

1. A freely moving, reversible valve including a body of generally cylindrical form, the ends thereof being tapered to engage a valve seat, annular recesses in the outer periphery of said body, a radial flange of smaller external diameter than said body between said recesses, said flange having slots therethrough inclined relative to the longitudinal axis of said body for the purpose described.

2. A valve including a body of generally cylindrical form, the ends thereof being tapered to engage a valve seat, annular recesses in the outer periphery of said body, a radial flange between said recesses, and surfaces formed on said flange and in the walls of said recesses inclined relative to the longitudinal axis of said body to be engaged by a flow of liquid and rotate said body.

3. A valve approximately cylindrical in shape, seating surfaces formed on the ends thereof and an annular flange between the ends of the valve, said flange being of smaller diameter than said ends and having inclined slots therethrough to permit the passage of fluid for the purpose described.

4. A valve approximately cylindrical in shape, seating surfaces formed on the ends thereof and an annular flange between the ends of the valve, said flange having inclined slots therethrough to permit the passage of fluid for the purpose described, there being recesses having inclined walls adjacent the ends of said valve, said valve being reversible end for end.

5. A valve approximately cylindrical in shape, tapered seating surfaces at each end of said valve, an annular groove in the cylindrical periphery of said valve, and recesses in the upper and lower walls of said groove, said recesses being inclined in the same direction to give rotative action to said valve.

6. A valve approximately cylindrical in shape, tapered seating surfaces at each end of said valve, an annular groove in the cylindrical periphery of said valve, and recesses in the upper and lower walls of said groove, said recesses being inclined in the same direction to give rotative action to said valve, and means between the ends of said groove to assist in the rotation of said valve.

7. A valve including a body approximately cylindrical at each end, tapered seat-engaging surfaces at the extremities of said body, an annular recess between said cylindrical ends, the end walls of said recess being formed with deep grooves cut in an inclined direction, said grooves being all inclined in the same direction relative to the longitudinal axis of the body to communicate a rotative movement thereto responsive to the flow of fluid thereby.

JAMES W. SANDLIN.